United States Patent [19]

Kim

[11] Patent Number: 5,841,477
[45] Date of Patent: Nov. 24, 1998

[54] METHOD FOR RECTIFYING CHANNEL ERRORS IN AN IMAGE SIGNAL TRANSMITTED FROM A BLOCK-BASED ENCODER

[75] Inventor: Jin-Hun Kim, Seoul, Rep. of Korea

[73] Assignee: Daewoo Electronics Co., Ltd., Seoul, Rep. of Korea

[21] Appl. No.: 651,381

[22] Filed: May 22, 1996

[30] Foreign Application Priority Data

Dec. 29, 1995 [KR] Rep. of Korea ................. 1995 64313

[51] Int. Cl.⁶ ............................. H04N 7/12; H04N 11/02; H04N 11/04; H04N 7/00
[52] U.S. Cl. ........................... 348/420; 348/466; 382/254
[58] Field of Search ................................. 348/398, 402, 348/420, 426, 466, 467, 571, 607, 616, 617; 358/426, 433, 447, 462; 382/232, 254, 275; H04N 7/12, 11/02, 11/04, 7/00, 11/00

[56] References Cited

U.S. PATENT DOCUMENTS

| 4,464,674 | 8/1984 | Schulz et al. | 348/617 |
| 5,142,537 | 8/1992 | Kutner et al. | 371/31 |
| 5,243,428 | 9/1993 | Challapali et al. | 348/607 |
| 5,247,363 | 9/1993 | Sun et al. | 348/616 |
| 5,353,059 | 10/1994 | Lawlor et al. | 348/398 |
| 5,365,604 | 11/1994 | Kwok et al. | 382/275 |
| 5,442,400 | 8/1995 | Sun et al. | 348/402 |
| 5,455,629 | 10/1995 | Sun et al. | 348/466 |
| 5,481,627 | 1/1996 | Kim | 382/254 |
| 5,511,136 | 4/1996 | Kim | 382/275 |
| 5,517,250 | 5/1996 | Hoogenboom et al. | 348/467 |
| 5,568,200 | 10/1996 | Pearlstein et al. | 348/426 |

*Primary Examiner*—Tommy P. Chin
*Assistant Examiner*—Nhon T Diep
*Attorney, Agent, or Firm*—Anderson, Kill & Olick, P.C.

[57] ABSTRACT

A method, for use in an image signal decoding system, for concealing errors in an image signal transmitted in a block-by-block compressed form, the decoding system including a decoding circuit for decoding the transmitted image signal into a decoded image signal on a block-by-block basis and detecting an erroneous block which contains an error, the erroneous block having a predetermined number of surrounding blocks without containing an error therein, each of the surrounding blocks having a multiplicity of pixels therein, the method comprises the steps of: classifying each of the surrounding blocks into a monotonous, an edge or a texture class, the monotonous class representing a block without containing an edge therein, the edge class representing a block containing one edge therein, and the texture class representing a block containing more than one edge therein; classifying the erroneous block as the edge class, if only one pair of the surrounding blocks positioned opposite each other with respect to the erroneous block is of the edge class and has an identical edge direction transversing the erroneous block; and, otherwise, as either the monotonous or the texture class depending on the number of the surrounding blocks having either the monotonous or the texture class; and rectifying the erroneous block based on the classification thereof.

6 Claims, 8 Drawing Sheets

FIG.3B
VERTICAL PROJECTION

FIG.3C
HORIZONTAL PROJECTION

FIG.3D
FIRST DIAGONAL PROJECTION

FIG.3E
SECOND DIAGONAL PROJECTION

FIG.3F

ERRONEOUS BLOCK

FIG.3G

ERRONEOUS BLOCK

| $T_1$ | $T_2$ | $M_1$ |
|---|---|---|
| $T_3$ | $DB_2$ | $M_2$ |
| $E_1$ | $T_4$ | $E_2$ |

FIG.6B $T_1$ —

| $dc_1$ | $ac_1$ | .... |
|---|---|---|
| $ac_2$ | $ac_3$ | .... |
| ⋮ | ⋮ | |

FIG.6C $T_2$ —

| $dc_2$ | $ac_4$ | .... |
|---|---|---|
| $ac_5$ | $ac_6$ | .... |
| ⋮ | ⋮ | |

FIG.6D $T_3$ —

| $dc_3$ | $ac_7$ | .... |
|---|---|---|
| $ac_8$ | $ac_9$ | .... |
| ⋮ | ⋮ | |

FIG.6E $T_4$ —

| $dc_4$ | $ac_{10}$ | .... |
|---|---|---|
| $ac_{11}$ | $ac_{12}$ | .... |
| ⋮ | ⋮ | |

FIG.6F $DB_2$ —

| $DC_1$ | $AC_1$ | .... |
|---|---|---|
| $AC_2$ | $AC_3$ | .... |
| ⋮ | ⋮ | |

METHOD FOR RECTIFYING CHANNEL ERRORS IN AN IMAGE SIGNAL TRANSMITTED FROM A BLOCK-BASED ENCODER

FIELD OF THE INVENTION

The present invention relates to an apparatus for decoding an image signal, and, more particularly, to an apparatus for concerning or rectifying channel errors present in a decoded image signal which has been transmitted from a block-based image signal encoder.

DESCRIPTION OF THE PRIOR ART

A typical block-based image signal encoder conforming to the MPEG(Moving Pictures Expert Group) standard performs a source coding which comprises a cascade of transform operation, quantization, and entropy coding. Specifically, an image is segmented into a plurality of non-overlapping blocks; then each block is transformed via DCT(Discrete Cosine Transform) to remove spatial redundancies therein; and, subsequently, the DCT coefficients are quantized and entropy coded using variable-length codewrods. Thereafter, the encoded image siganl is transmitted to a decoder via a transmission channel.

Since, however, channel errors are apt to occur during the transmission process, in order to reduce or rectify the channel errors, conventionally, a channel coding has been carried out with respect to the encoded image signal by employing various error-control coding methods. In a conventional error-control coding method, extra bits are added to each predetermined set of source codes to detect and correct the channel errors during a decoding process. Correction of errors in this manner is possible only to a limited extent, however. If the amount of errors occurred in a predetermined set exceeds the capacity of an error correction scheme, those errors cannot be corrected and the entire pixel data of a decoded block containing such error(s) may be designated as an error without any possibility of correcting the wrong designation. The resulting image will then be flawed due to, e.g., the absence of block-based pixel data that may be noticeably perceived by human vision. To deal with such problem, therefore, various error concealment schemes such as POCS(Projections onto Convex Sets) method have been proposed to conceal or estimate the pixel data of an error containing block, to thereby compensate for the degradation which may have occurred in the transmission process(see, e.g., Huifang Sun et al., "Concealment of Damaged Block Transform Coded Images Using Projections onto Convex Sets", *IEEE Transactions on Image Processing*, 4, No. 4, pp. 470–477(April 1955). However, such prior art error concealment methods remain unsatisfactory as they fail to fully tade into account the characteristics of a given image signal.

SUMMARY OF THE INVENTION

It is, therefore, a primary object of the present invention to provide an improved channel error correcting method which is capable of remedying channel errors of an image signal based on the characteristics of the image signal.

In accordance with one the present invention, there is provided a method, for use in an image signal decoding system, for concealing errors in an image signal transmitted in a block-by-block compressed form, the decoding system including a decoding circuit for decoding the transmitted image signal into a decoded image signal on a block-by-block basis and detecting an erroneous block which contains an error, the erroneous block having a predetermined number of surrounding blocks without containing an error therein, each of the surrounding blocks having a multiplicity of pixels therein, said method comprising the steps of:

classifying each of the surrounding blocks into a monotonous, an edge or a texture class, the monotonous class representing a block without containing an edge therein, the edge class representing a block containing one edge therein, and the texture class representing a block containing more than one edge therein;

classifying the erroneous block as the edge class, if only one pair of the surrounding blocks positioned opposite each other with respect to the erroneous block is of the edge class and has an identical edge direction transversing the erroneous block; and, otherwise, as either the monotonous or the texture class depending on the number of the surrounding blocks having either the monotonous or the texture class; and rectifying the erroneous block based on the classification thereof such that the pixels included in the erroneous block are of an identical value obtained by averaging the pixel values of the surrounding blocks if the erroneous block is of the monotonous class, such that the pixel values for the erroneous block are determined based on the pixel values forming said identical edge direction transversing the erroneous block if the erroneous block is of the edge class, and such that the pixel values for the erroneous block are determined based on the pixel values for the surrounding blocks of the texture class if the erroneous block is of the texture class.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
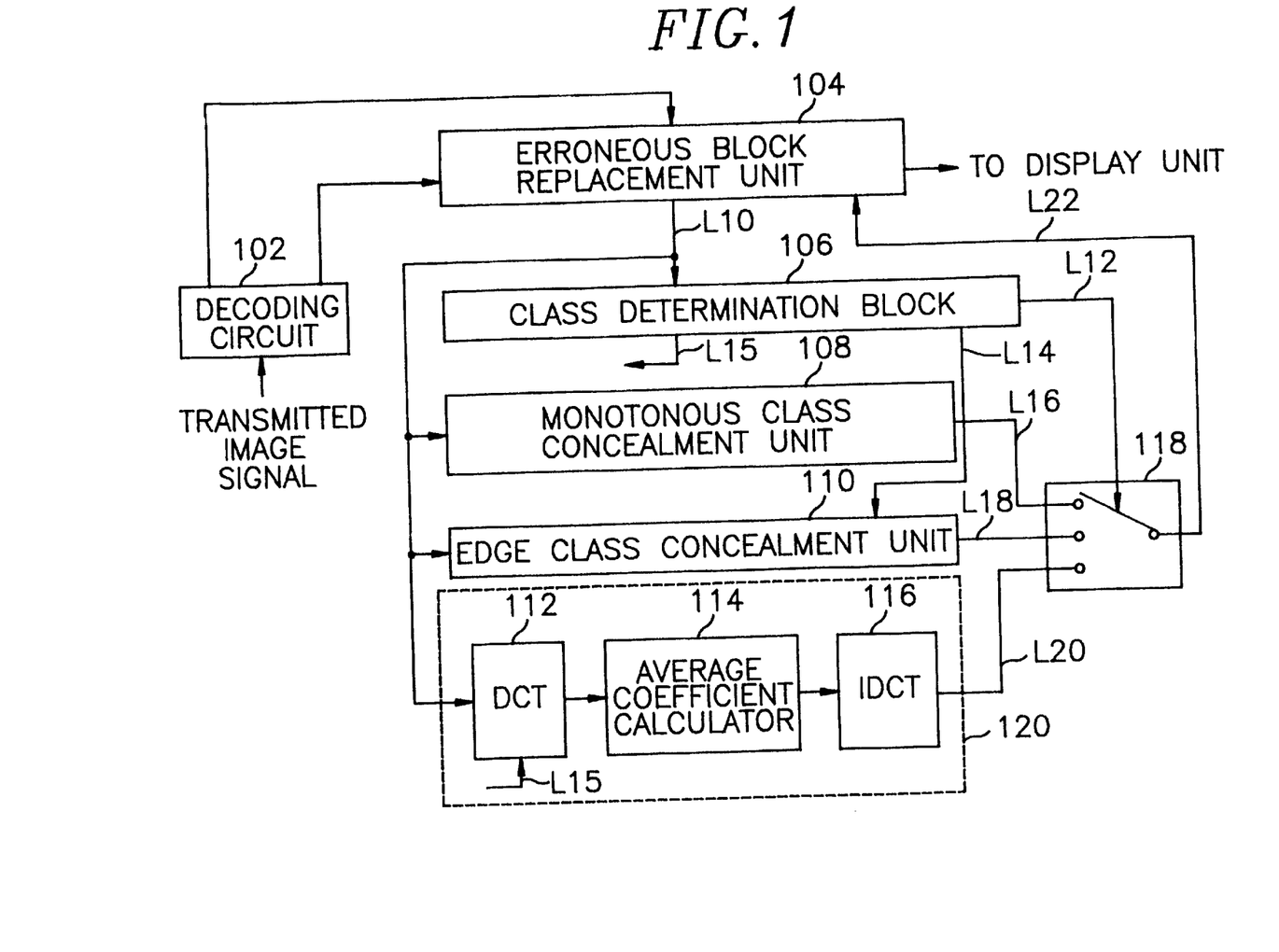
FIG. 1 represents a block diagram of a channel error concealment apparatus in accordance with the present invention.

Referring to FIG. 1, there is shown a block diagram of a channel error concealment apparatus in accordance with a preferred embodiment of the present invention. As shown in FIG. 1, a transmitted image signal is fed to a decoding circuit 102 through a transmission channel, wherein the transmitted image signal has been source-coded on a block-by-block basis and channel-coded by using a conventional error-control coding scheme at a transmitting end. At the decoding circuit 102, the transmitted image signal is decoded into a decoded image signal on a block-by-block basis. Errors which may have occurred in the transmission channel are also detected and corrected at the decoding circuit 102. Such errors can be corrected by using an error-correction scheme based on extra bits appended by the error-control coding scheme. However, should there occur a large number of errors than the capacity allowed in the error correction scheme, those errors cannot be corrected; and a whole block containing any of such uncorrected errors will be designated as an erroneous block and cannot be decoded. Outputs from the decoding circuit 102 are pixel data for the decoded blocks of the image signal and an error information signal indicating the erroneous block, which are applied to an erroneous block replacement unit 104. At the erroneous block replacement unit 104, in response to the error information signal designating the position of the erroneous block, a number of, e.g. 8, surrounding blocks thereof are retrieved from a storage therein (not shown), wherein the decoded image signal is stored; and a position information signal and the retrieved surrounding blocks are sent via a line L10 to a class determination blocks 106, a monotonous class concealment unit 108, an edge class concealment unit 110 and a texture class concealment unit 120. The erroneous block is rectified by employing one of the three concealment units, selected based on the class information of the surrounding blocks.

The class determination block 106, in order to select a best rectifying method suitable to the characteristics of the image signal, first classifies each of the surrounding blocks into one of the three categories based on an edge pattern thereof: i.e., a monotonous class which corresponds to a block having no edge herein, an edge class which corresponds to a block having one edge therein and a texture class which corresponds to a block having more that one edge therein, and then, determines the class of the erroneous block based on the class information of the surrounding blocks. The class information of the erroneous block is then supplied via a line L12 to a switch 118 and used therein as a control signal thereof. Details of the class determination block 106 is described with reference to FIG. 2.

Figure 2:
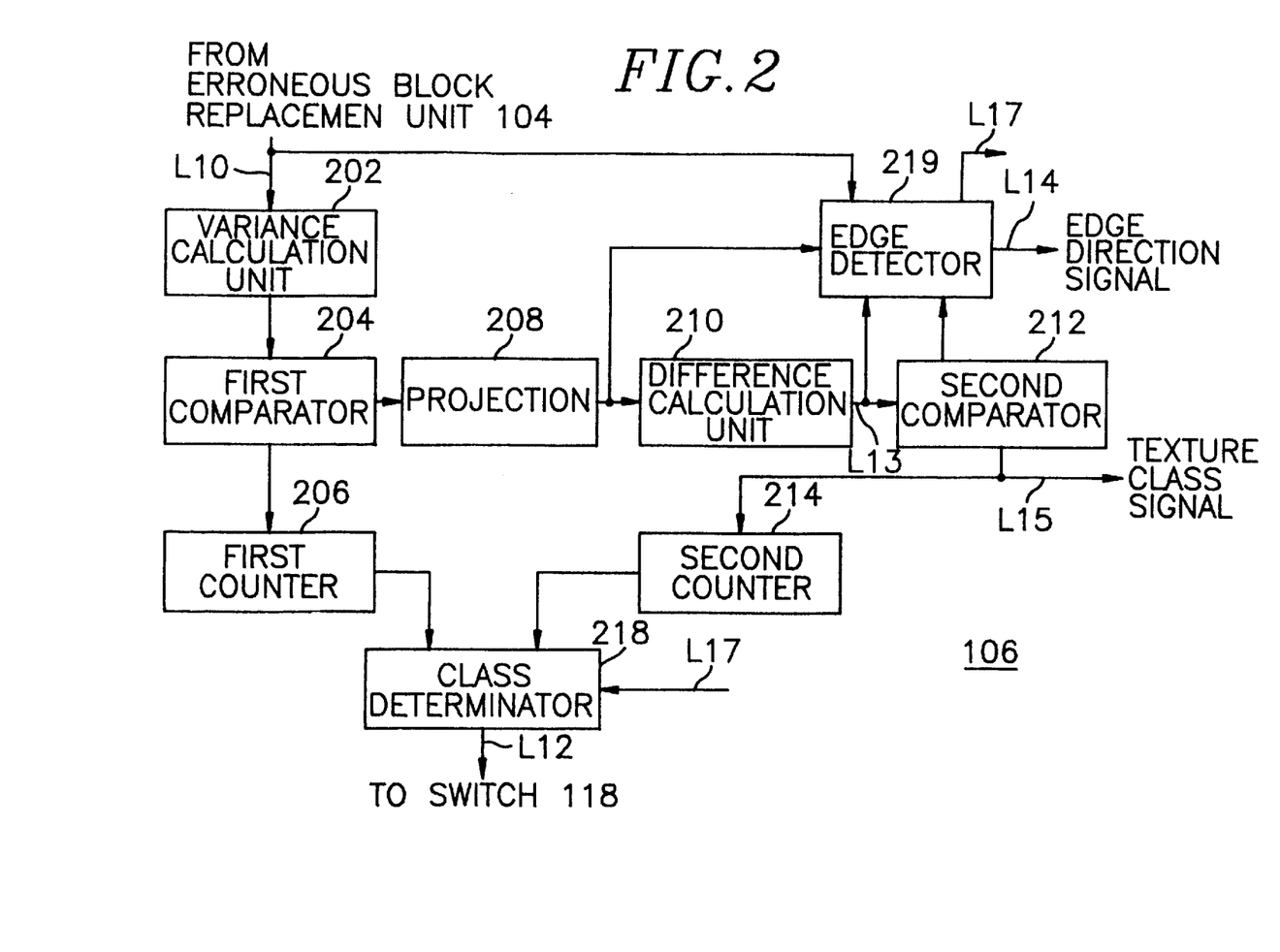
FIG. 2 provides a detailed block diagram of a class determination block of the channel error concealment apparatus of FIG. 1.

Referring to FIG. 2, the pixel data and the position information signal for each of the surrounding blocks from the erroneous block replacement unit 104 are inputted to a variance calculation unit 202 and an edge detector 219 via a line L10, respectively. At the variance calculation unit 202, a variance for each of the surrounding blocks is calculated to determine whether there exists at least one edge in each of the surrounding blocks. The variance $B_{var}$ may be derived as follows:

$$B_{var} = \frac{1}{N \cdot N} \sum_{i=1}^{N} \sum_{j=1}^{N} (X(i,j) - B_m)^2 \quad \text{Eq. 1}$$

wherein N is the total number of pixels located in a row and a column of a surrounding block, respectively; $B_m$ is a mean pixel value of the surrounding block; and $X(i,j)$ is a pixel value at a pixel position (i,j) in the surrounding block. Both the variance and the pixel values for each of the surrounding blocks are supplied to a first comparator 204.

At the first comparator 204, the variance $B_{var}$ for each surrounding block is then compared with a first threshold value TH1. If the variance $B_{var}$ is larger than TH1, it is determined that the corresponding surrounding block has one or more edges and the pixel values of the surrounding block are fed to a projection block 208. If the variance $B_{var}$ is equal to or smaller than TH1, the corresponding surrounding block is considered to be of the monotonous class having no edges therein and a logic high signal is provided to a first counter 206, wherein the number of surrounding blocks of the monotonous class is counted.

At the projection block 208, in order to determine whether each of the surrounding blocks provided from the first comparator 204 has one or more than one edges, a number of directional projections are performed with respect to each of the surrounding blocks applied thereto.

Figure 3A:
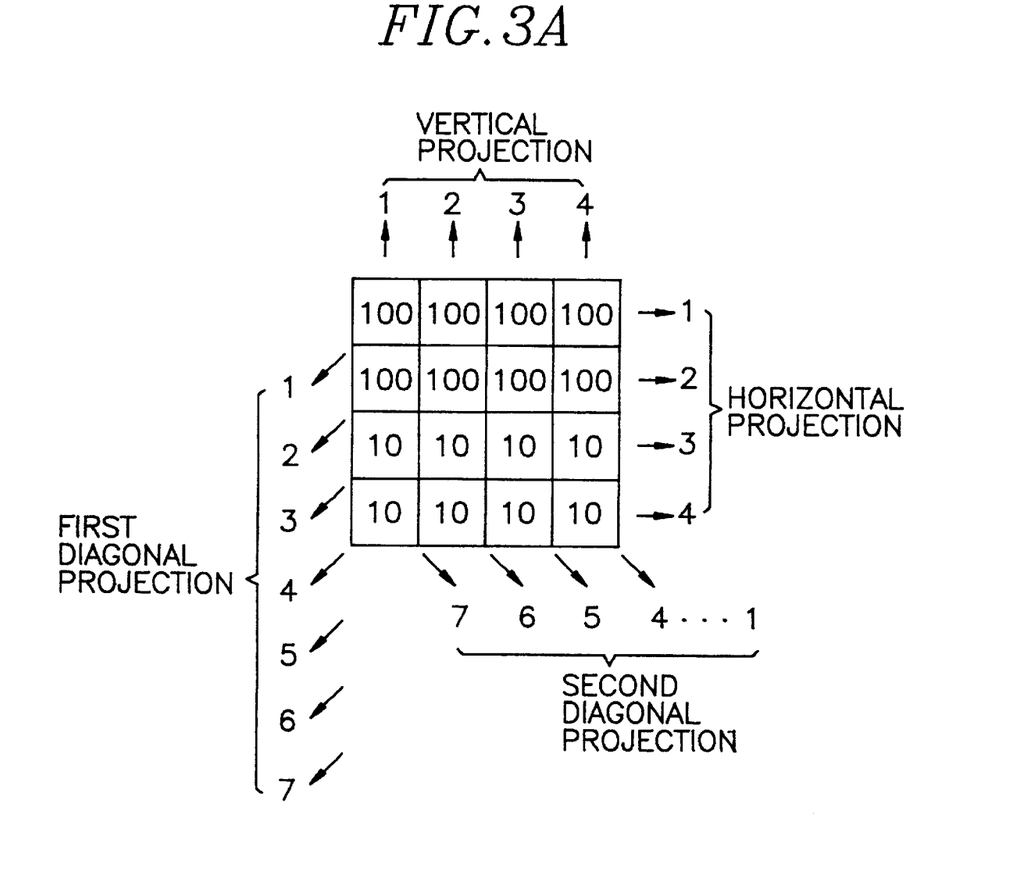
FIGS. 3A to 3G explain the operation of the class determination block shown in FIG. 1.
Figure 3B:
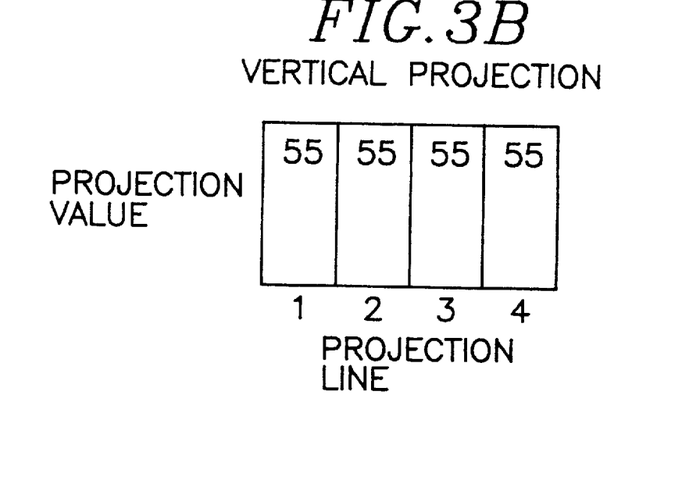
Figure 3C:
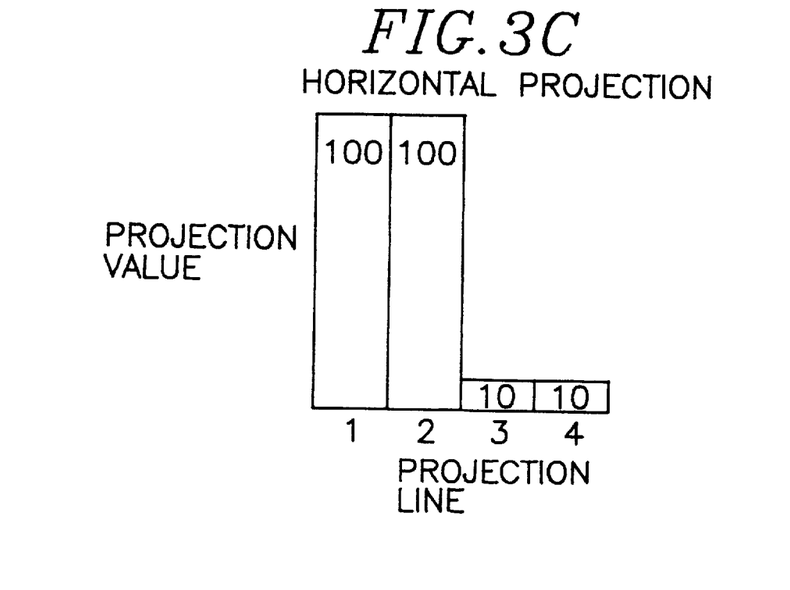
Figure 3D:
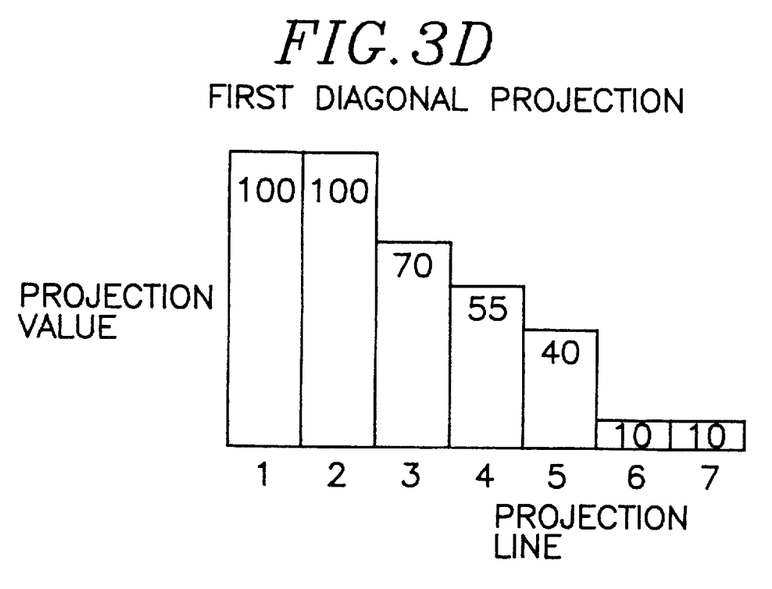
Figure 3E:
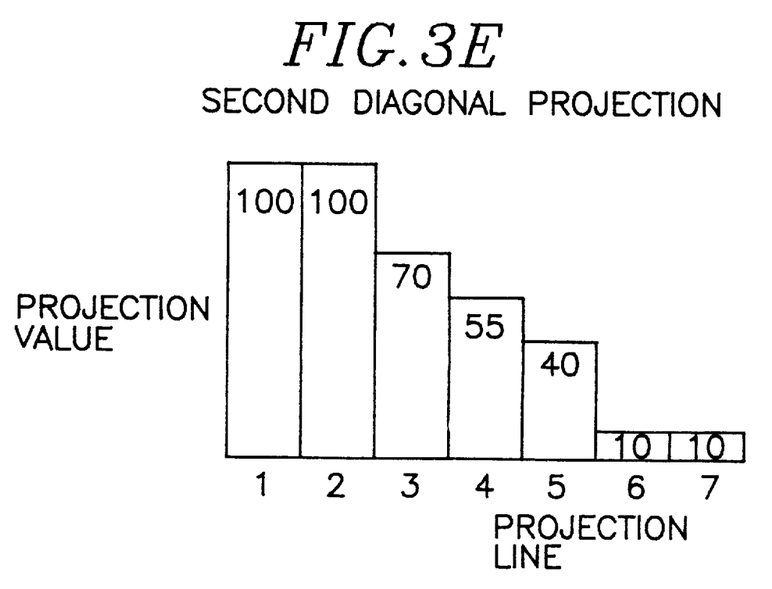

Referring to FIGS. 3A to 3E, there are schematically illustrated four directional projection processes carried out at the projection block 208 in accordance with the present invention. For an exemplary 4×4 block having 16 pixel values, the results of the four directional projections, i.e., a vertical, a horizontal, a first diagonal and a second diagonal projections performed as shown in FIG. 3A, are shown in FIGS. 3B to 3E, respectively. Each of projection values in FIGS. 3B to 3E is an average value of the pixels lying along each of projection lines which are referenced by respective numerals shown in FIG. 3A. The projection results are then provided to a difference calculation unit 210 and the edge detector 219.

At the difference calculation unit 210, a first difference between the result of the vertical projection and that of the horizontal projection and a second difference between the result of the first diagonal projection and that of the second diagonal projection are computed. The first difference is determined as follows: an absolute value of a difference between a projection value for each of the projection lines 1 to 4 of the horizontal projection and that for its corresponding projection lines referenced by an identical numeral in the vertical projection is computed first; and then, the first difference is obtained by averaging the absolute values of the differences for all the projection lines. The second difference is determined in a similar manner. The first and the second differences are sent via a line L13 to a second comparator 212 and the edge detector 219.

At the second comparator 212, the first and the second differences are compared with a second predetermined threshold TH2. If only one of the differences is larger than or equal to TH2, it implies that there exists only one edge or a dominant edge therein and thus the surrounding block is classified as the edge class corresponding to a block having one edge therein. Output from the second comparator 212 in such a case is an edge class signal, sent to the edge detector 219, the edge class signal indicating that the surrounding block is of the edge class. In case both differences are smaller than TH2, it is interpreted as an indication of the presence of more than one non-dominant edges therein; and, accordingly, the block is classified as the texture class. And further, if both differences are larger than or equal to TH2, the block is also classified as the texture class. For such result implies the existence of more than one competing strong edges in the block. In case that the given surrounding block is determined as the texture class, a logic high texture class signal, indicating that the current surrounding block is of the texture class, is sent via a line L15 to the texture class concealment unit 120 shown in FIG. 1, and a second counter 214 wherein the number of surrounding blocks of the texture class is counted.

At the edge detector 219, the direction of an edge in each of the surrounding blocks of edge class is determined, and then the existence and the direction of an edge in the erroneous block is determined based on the edge directions of the surrounding blocks of edge class as follows. First, in order to determine the edge direction for each of the surrounding blocks of the edge class, the two differences for a given surrounding block are compared with each other, in response to the edge class signal from the second comparator 212, to select a set of projections entailing a larger difference, i.e., a set of the vertical and the horizontal projections or a set of the first and the second diagonal projections; and then, a variance of the projection values for each projection of the selected set is calculated to determine a larger variance therefrom. Subsequently, the direction of a projection having the larger variance is selected as an edge direction for the given surrounding block. As for the example shown in FIGS. 3A to 3E, a set of vertical and horizontal projections has a larger difference and the variance of the horizontal projection is greater than that of the vertical projection: and, therefore, a surrounding block having pixel values as shown in FIG. 3A is considered to have horizontal edge direction. In case the variances of the selected set are identical incidently, such surrounding block is treated as of a non-edge class and the edge direction thereof is not determined at the edge detector 219. It should be noted that the determined edge of a surrounding block is assumed to pass through the center thereof. In other words, an edge in a surrounding block of edge class is quantized into one of the four edges passing through the center portion thereof.

Figure 3F:
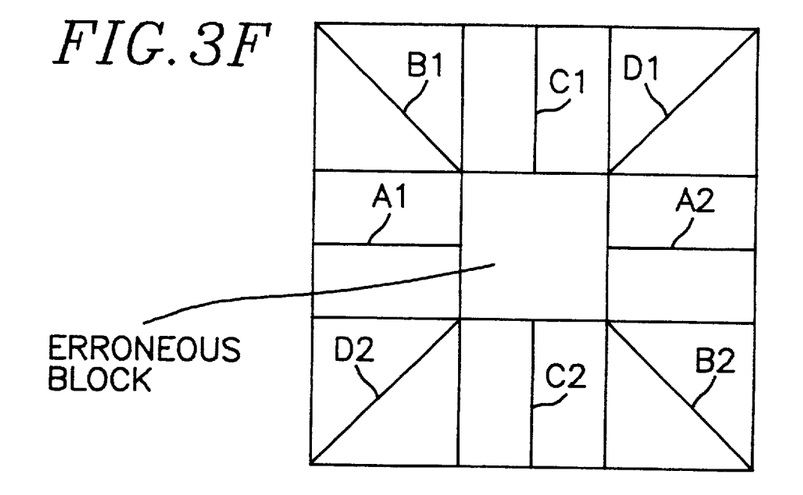
Figure 3G:
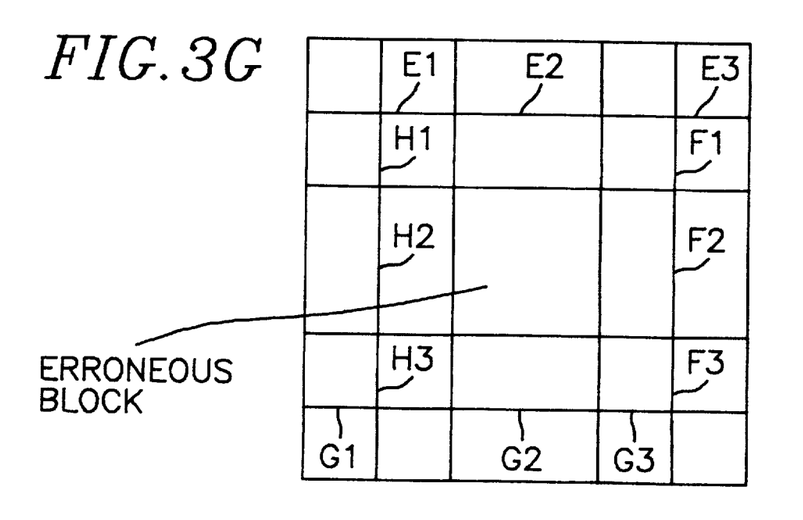

After determining the edge direction for each of the surrounding blocks of edge class, such surrounding blocks are disposed at their respective positions in response to the position information signal from the erroneous block replacement unit 104; and then an edge directions of the erroneous block is determined based on the edge directions of the surrounding blocks of edge class. Specifically, if and only if one pair of surrounding blocks positioned opposite each other with respective to the erroneous block has edges of an identical direction, e.g., A1 and A2, B1 and B2, C1 and C2, or D1 and D2 as shown in FIG. 3F, the erroneous block is classified as the edge class and the edge direction corresponding to that pair of the surrounding blocks is assigned as the edge direction of the erroneous block. In such a case, an edge detection signal is fed to a class determinator 218 via a line L17, while an edge direction signal representing the determined edge direction of the erroneous block is applied via a line L14 to the edge class concealment unit 110 shown in FIG. 1. In all other cases, for instance, if a set of edges of the surrounding blocks such as (E1, E2 and E3), (F1, F2 and F3), (G1, G2 and G3) and (H1, H2 and H3) shown in FIG. 3G, run parallel to the row or column direction of the erroneous block without passing therethrough or if there exist more than one pair of such surrounding blocks shown in FIG. 3F, the erroneous block is determined as a non-edged class.

At the class determinator 218, the class of the erroneous block is determined in response to the counted numbers from the counters 206 and 214 and the edge detection signal from the edge detector 219. That is, if the edge detection signal is supplied thereto, the erroneous block is determined as the edge class irrespective of the counted numbers from the first counter 206 and 214. Otherwise, the counted numbers from the first counter 206 and the second counter 214 are compared with each other and a class corresponding to the larger counted number is chosen to define the class of the erroneous block, i.e., if the counted number form the first counter 206 is larger than or equal to that from the second counter 214, the erroneous block is classified as the monotonous class and, otherwise, the block is classified as the texture class. A class signal representing the class of the erroneous block is sent via the line L12 to the switch 118 as the switching control signal.

Figure 4:
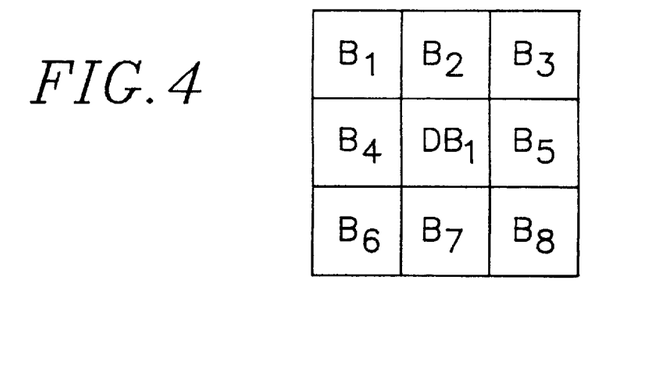
FIG. 4 shows an error containing block and its surrounding blocks for describing the operation of the monotonous class concealment unit of FIG. 1.

Referring back to FIG. 1, at the monotonous class concealment unit 108, pixel values of the erroneous block are estimated based on the pixel data of all the surrounding blocks. Specifically, as for the example shown in FIG. 4, the surrounding blocks $B_1$ to $B_8$ of the erroneous block $DB_1$ are classified into two groups, i.e., a group of edge blocks $B_2$, $B_4$, $B_5$ and $B_7$, and a group of corner blocks $B_1$, $B_3$, $B_6$ and $B_8$, the edge blocks being the blocks surrounding the erroneous block by an edge and the corner blocks being the blocks contiguous thereto by a corner. A representative pixel value of the erroneous block DB may be obtained as follows:

$$E = w_1(m_1+m_3+m_6+m_8) + w_2(m_2+m_4+m_5+m_7) \qquad \text{Eq. (2)}$$

wherein E is the representative pixel value for the erroneous block DB, m, is an averaged value of the surrounding block B, with k being 1 to 8, and w and w are weight factors. The sum of two weight factors is ¼ and w is smaller than w because the surrounding edge blocks are more influential to the erroneous block than the corner blocks. The representative pixel value is set as the estimated value for all the pixels of the erroneous block and fed to the switch 118 as a first rectified block signal via a line L16.

Figure 5A:
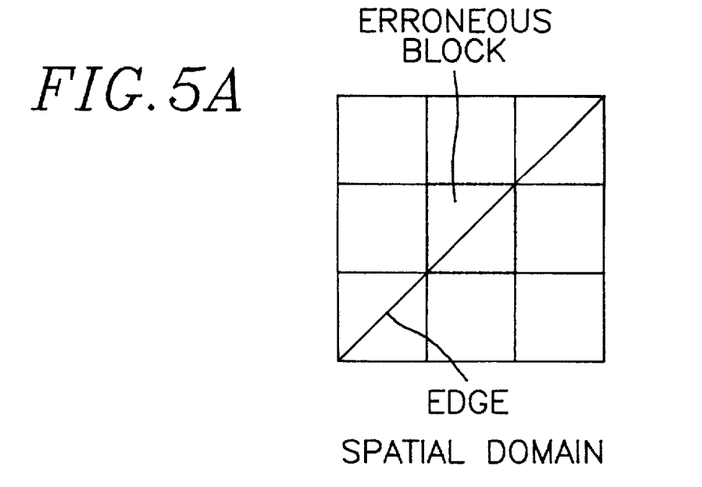
FIGS. 5A and 5B schematically illustrate the operation of the edge class concealment unit of FIG. 1.
Figure 5B:
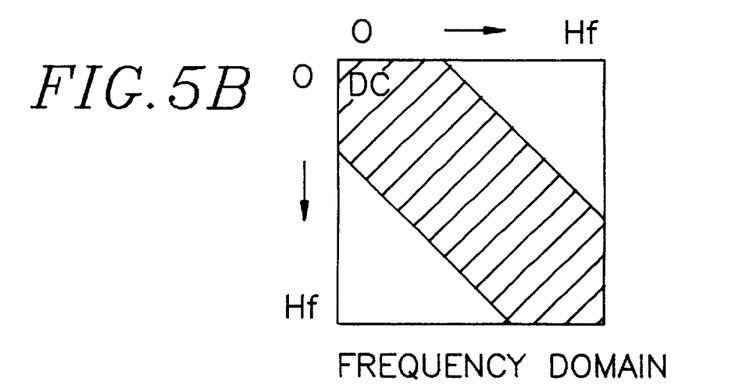

In the meanwhile, an erroneous block of the edge class is rectified by the edge class concealment unit 110 through the use of an iterative restoration algorithm described in Huifang Sun et al., supra. The iterative restoration algorithm has three steps. First, if the edge direction signal is provided from the edge detector 219 shown in FIG. 2, all the pixel values of the erroneous block are set to zero and a processing block consisting of the erroneous block and its surrounding blocks is transformed by using, e.g., a Fourier Transform, to produce a set of transform coefficients, wherein the edge direction of the processing block in the spatial domain is reflected in a porting of the transform coefficients of the set in the frequency domain along the direction normal to the edge direction. Subsequently, in order to utilize spatially correlated edge information in the processing block, transform coefficients lying outside the portion of the transform coefficients in the set are masked with zero values; and a transform block is inverse-transformed by using, e.g., an inverse Fourier Transform to thereby reconstruct the processing block, wherein the transform block consists of the unmasked transform coefficients of the portion and the zero-valued masked transform coefficients outside the portion. Finally, pixel values of the reconstructed processing block corresponding to the surrounding blocks are replaced by the original pixels values thereof, thereby providing a masked processing block, wherein the masked processing block consists of the original pixel values of the processing block of the surrounding block positions and reconstructed pixel values at the erroneous block position. For example, if the edge of the processing block is of a diagonal direction as shown in FIG. 5A, pixel values of the erroneous block are set to zeros and the entire processing block is transformed by using the Fourier Transform technique to thereby provide a set of transform coefficients having a DC value at (o,o) position and high frequency(Hf) components as shown in FIG. 5B. Thereafter, using the hatched portion of the transform coefficients including the DC value along the direction orthogonal to the edge direction and zero masked transform coefficients positioned outside the hatched portion, inverse Fourier Transform is carried out to reconstruct the processing block. These steps are iterated N times with respected to the masked processing block, N being a predetermined number, to thereby update the pixel values of the erroneous block N times to produce estimated pixel values for the erroneous block of the edge class. The estimated pixel values are fed to the switch 118 as a second rectified block signal via a line L18.

Figure 6A:
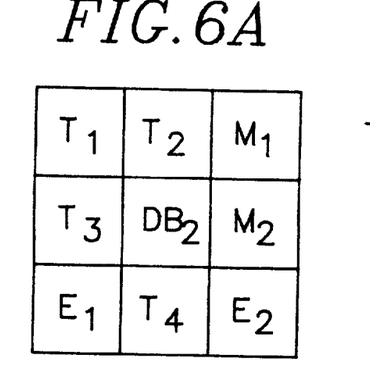
FIGS. 6A to 6F schematically depict the inventive concealment method in case the erroneous block is of a texture class.
Figure 6B:
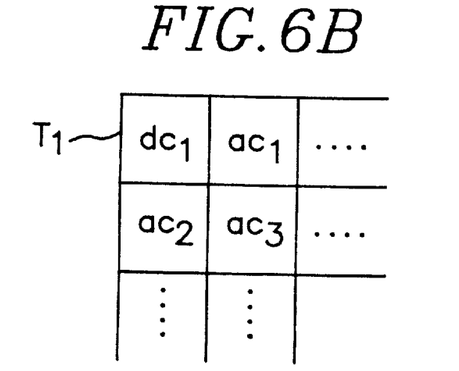
Figure 6C:
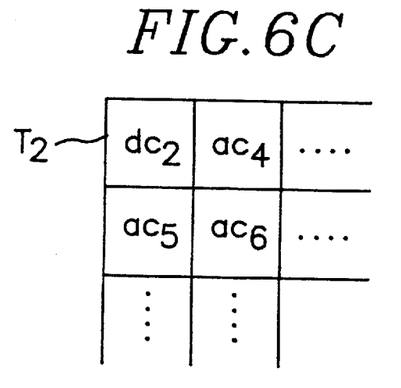
Figure 6D:
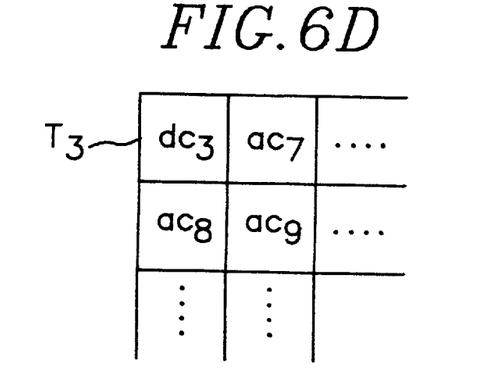
Figure 6E:
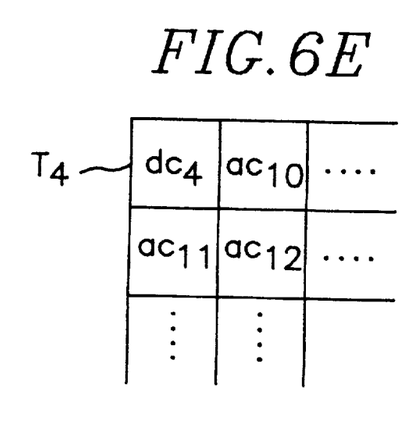

At the texture class concealment unit 120 having a DCT(discrete cosine transform) block 112, an average coefficient calculator 114 and an IDCT(inverse discrete cosine transform)block 116, the erroneous block of the texture class is rectified using its surrounding block of the same type. For example, the surrounding blocks of an erroneous block $DB_2$ include monotonous blocks $M_1$ and $M_2$, edge blocks $E_1$ and $E_2$ and texture blocks $T_1$ to $T_4$ as shown in FIG. 6A, the erroneous block $DB_2$ is rectified using four texture class blocks, $T_1$ to $T_4$. Specifically, at the DCT block 112, each of the texture class surrounding blocks $T_1$ to $T_4$, is converted into a set of DCT transform coefficients in response to the texture class signal fed from the second comparator 212 shown in FIG. 2 within the class determination block 106, wherein the set of DCT transform coefficients for each of the blocks $T_1$ to $T_4$ includes a DC and a predetermined number of AC coefficients as shown in FIGS. 6B to 6E, respectively, each of the coefficients representing the magnitude of its corresponding frequency component.

Figure 6F:
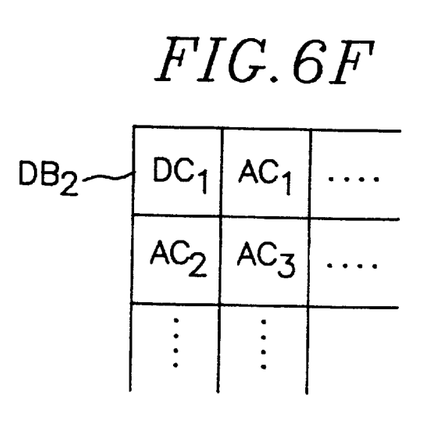

At the average coefficient calculator 114, the transform coefficient of each of frequency component for the erroneous block is calculated by averaging the coefficients of the corresponding frequency component for the surrounding blocks of the texture class. With reference to FIG. 6F, there are illustrated transform coefficients for the erroneous block DB2, wherein $DC_1$ is an average transform coefficients $dc_1$ to $dc_4$ for the surrounding blocks $T_1$ to $T_4$ shown in FIGS. 6B to 6E; AC1 is an average transform coefficient of the AC coefficients ac1, ac4, ac7 and ac10; AC2, an average transform coefficient of the AC coefficients ac2, ac5, ac8 and ac11; and AC3, an average transform coefficient of ac3, ac6, ac9 and ac12, and so on. At the IDCT block 116, a set of average transform coefficients shown in FIG. 6F is converted into estimated pixel values for the erroneous block of the texture class. The estimated pixel values are fed to the switch 118 as a third rectified block signal via a line L20.

The switch 118, in response to the class signal from the class determination block 106, selects one of the rectified block signals provided from the three concealment units 108, 110 and 120. The selected rectified block signal is sent to the erroneous block replacement unit 104, wherein the erroneous block is replaced by the selected rectified block signal. After processing all the erroneous blocks in the decoded image signal, the rectified image signal is provided to, e.g., a display unit(not shown) for the display thereof.

While the present invention has been shown and described in connection with the preferred embodiments only, it will be apparent to those of ordinary skill in the art that many changes and modifications may be made without departing from the spirit and scope of the invention as defined in the appended claims.

What is claimed is:

1. A method, for use in an image signal decoding system, for concealing errors in an image signal transmitted in a block-by-block compressed form, the decoding system including a decoding circuit for decoding the transmitted image signal into a decoded image signal on a block-by-block basis and detecting an erroneous block which contains an error, the erroneous block having a predetermined number of surrounding blocks without containing an error therein, each of the surrounding blocks having a multiplicity of pixels therein, the method comprising the steps of:

(a) classifying each of the surrounding blocks into one of a monotonous class, an edge class and a texture class in accordance with a variance of said each surrounding block and projection values of said each surrounding block resulting from directional projection process, the monotonous class representing a block without containing an edge therein, the edge class representing a block containing one edge therein, and the texture class representing a block containing more than one edge therein;

(b) classifying the erroneous block as the edge class, if only one pair of the surrounding blocks positioned opposite each other with respect to the erroneous block is of the edge class and has an identical edge direction transversing the erroneous block; and, otherwise, as either the monotonous or the texture class depending on the number of the surrounding blocks having either the monotonous or the texture class; and (c) rectifying the erroneous block based on the classification thereof such that the pixels included in the erroneous block are of an identical value obtained by averaging the pixel values of the surrounding blocks if the erroneous block is of the monotonous class, such that the pixel values for the erroneous block are determined based on the pixel values forming said identical edge direction transversing the erroneous block if the erroneous block is of the edge class, and such that the pixel values for the erroneous blocks are determined based on the pixel values for the surrounding blocks of the texture class if the erroneous block is of the texture class;

wherein the surrounding blocks include four edge blocks surrounding the erroneous block by an edge distance and four corner blocks contiguous to the erroneous block by a corner distance;

wherein said identical value used in rectifying the erroneous block of the monotonous class is obtained by multiplying a first weight factor to the pixel values of the four edge blocks and a second weight factor to the pixel values of the four corner blocks and summing up the weighted pixel values;

wherein said errors are channel errors from a transmission of the image signal; and wherein the step (a) includes the steps of:

(a1) calculating a variance for each of the surrounding blocks;

(a2) comparing the variance for each of the surrounding blocks with a first threshold value;

(a3) classifying a surrounding block having a variance larger than the first threshold value into a target surrounding block and classifying a surrounding block having a variance equal to or smaller than the first threshold value into the monotonous class;

(a4) calculating a first difference between a vertical projection value and a horizontal projection value for the target surrounding block and calculating a second difference between a first diagonal projection value and a second diagonal projection value for the target surrounding block;

(a5) comparing the first and the second differences with a second threshold; and (a6) classifying the target surrounding block into the edge class if only one of the differences is larger than or equal to the second threshold and classifying the target surrounding block into the texture class if both differences are smaller or larger than the second threshold.

2. The method of claim 1, wherein the variance is calculated as:

$$B_{var} = \frac{1}{N \cdot N} \sum_{i=1}^{N} \sum_{j=1}^{N} (X(i,j) - B_m)^2$$

wherein $B_{var}$ represents the variance; N is the total number of pixels located in a row and a column of a surrounding block, respectively; $B_m$ is a mean pixel value of the surrounding block; and $X(i,j)$ is a pixel value at a pixel position $(i,j)$ in the surrounding block.

3. The method of claim 2, wherein the step (a4) includes the steps of:
- (a41) calculating an absolute value of difference between a projection value for each of projection lines of a horizontal projection and that for its corresponding projection lines referenced by an identical numeral in vertical projection; and
- (a42) averaging the absolute values of the difference is obtained by averaging the absolute values of the differences for all the projection lines to thereby generate the first differences.

4. An apparatus, for use in an image signal decoding system, for concealing errors in an image signal transmitted in a block-by-block compressed form, the decoding system including a decoding circuit for decoding the transmitted image signal into a decoded image signal on a block-by-block basis and detecting an erroneous block which contains an error, the erroneous block having a predetermined number of surrounding blocks without containing an error therein, each of the surrounding blocks having a multiplicity of pixels therein, the apparatus comprising:

- first classification means for classifying each of the surrounding blocks into one of a monotonous class, an edge class and a texture class based on a variance of said each surrounding block and projection values of said each surrounding block resulting from directional projection process, the monotonous class representing a block without containing an edge therein, the edge class representing a block containing one edge therein, and the texture class representing a block containing more than one edge therein;
- second classification means for classifying the erroneous block as the edge class, if only one pair of the surrounding blocks positioned opposite each other with respect to the erroneous block is of the edge class and has an identical edge direction transversing the erroneous block; and, otherwise, as either the monotonous or the texture class depending on the number of the surrounding blocks having either the monotonous or the texture class; and
- rectification means for rectifying the erroneous block based on the classification thereof such that the pixels included in the erroneous block are of an identical value obtained by averaging the pixel values of the surrounding blocks if the erroneous block is of the monotonous class, such that the pixel values for the erroneous block are determined based on the pixel values forming said identical edge direction transversing the erroneous block if the erroneous block is of the edge class, and such that the pixel values for the erroneous blocks are determined based on the pixel values for the surrounding blocks of the texture class if the erroneous block is of the texture class;
- wherein the surrounding blocks include four edge blocks surrounding the erroneous block by an edge distance and four corner blocks contiguous to the erroneous block by a corner distance;
- wherein said identical value used in rectifying the erroneous block of the monotonous class is obtained by multiplying a first weight factor to the pixel values of the four edge blocks and a second weight factor to the pixel values of the four corner blocks and summing up the weighted pixel values;
- wherein said errors are channel errors from a transmission of the image signal; and wherein the first classification means includes:
- first calculation means for calculating a variance for each of the surrounding blocks;
- first comparison means for comparing the variance for each of the surrounding blocks with a first threshold value;
- means for classifying a surrounding block having a variance larger than the first threshold value into a target surrounding block and classifying a surrounding block having a variance equal to or smaller than the first threshold value into the monotonous class;
- second classification means for calculating a first difference between a vertical projection value and a horizontal projection value for the target surrounding block and calculating a second difference between a first diagonal projection value and a second diagonal projection value for the target surrounding block;
- second comparing means for comparing the first and the second differences with a second threshold; and
- means for classifying the target surrounding block into the edge class if only one of the differences is larger than or equal to the second threshold and classifying the target surrounding block into the texture class if both differences are smaller or larger than the second threshold.

5. The apparatus of claim 4, wherein the variance is calculated as:

$$B_{var} = \frac{1}{N \cdot N} \sum_{i=1}^{N} \sum_{j=1}^{N} (X(i,j) - B_m)^2$$

wherein $B_{var}$ represents the variance; N is the total number of pixels located in a row and a column of a surrounding block, respectively; $B_m$ is a mean pixel value of the surrounding block; and $X(i,j)$ is a pixel value at a pixel position $(i,j)$ in the surrounding block.

6. The apparatus of claim 5, wherein the second calculation means contains:
- means for calculating an absolute value of difference between a projection value for each of projection lines of a horizontal projection and that for its corresponding projection lines referenced by an identical numeral in vertical projection; and
- means for averaging the absolute values of the difference is obtained by averaging the absolute values of the differences for all the projection lines to thereby generate the first differences.

* * * * *

UNITED STATES PATENT AND TRADEMARK OFFICE
CERTIFICATE OF CORRECTION

PATENT NO. : 5,841,477
DATED : November 24, 1998
INVENTOR(S) : Jin-Hun Kim

It is certified that error appears in the above-identified patent and that said Letters Patent is hereby corrected as shown below:

Title page, item [30] should read as follows:
    [30]   Foreign Application Priority Data Dec. 29, 1995   [KR]   Rep. of Korea         95-64313

Signed and Sealed this

Sixteenth Day of March, 1999

Attest:

Q. TODD DICKINSON

Attesting Officer     Acting Commissioner of Patents and Trademarks